Aug. 23, 1927.

H. J. RIACH 1,639,812

POWER TAKE-OFF DEVICE

Filed Nov. 24, 1922

Inventor
Henry J. Riach
By Bradbury + Caswell
Attorneys

Patented Aug. 23, 1927.

1,639,812

UNITED STATES PATENT OFFICE.

HENRY J. RIACH, OF ST. PAUL, MINNESOTA, ASSIGNOR TO GRANT WALDREF, OF ST. PAUL, MINNESOTA.

POWER TAKE-OFF DEVICE.

Application filed November 24, 1922. Serial No. 603,130.

My invention relates to improvements in power take-off devices, its object being to supply a unitary structure of this nature, which is simple, durable and efficient, the same supplying a hand-hole cover for a gear case and a grease filler spout therefor.

A further object is to provide a power take-off device, a filler spout being incorporated in the housing thereof and supplying a lubricant gauge for a gear case with which the device is associated, also a lubricant bath for the take-off gearing.

With the foregoing and other objects in view, which will appear in the following description, the invention resides in the novel combination and arrangement of parts and in the details of construction hereinafter described and claimed.

Figure 2:
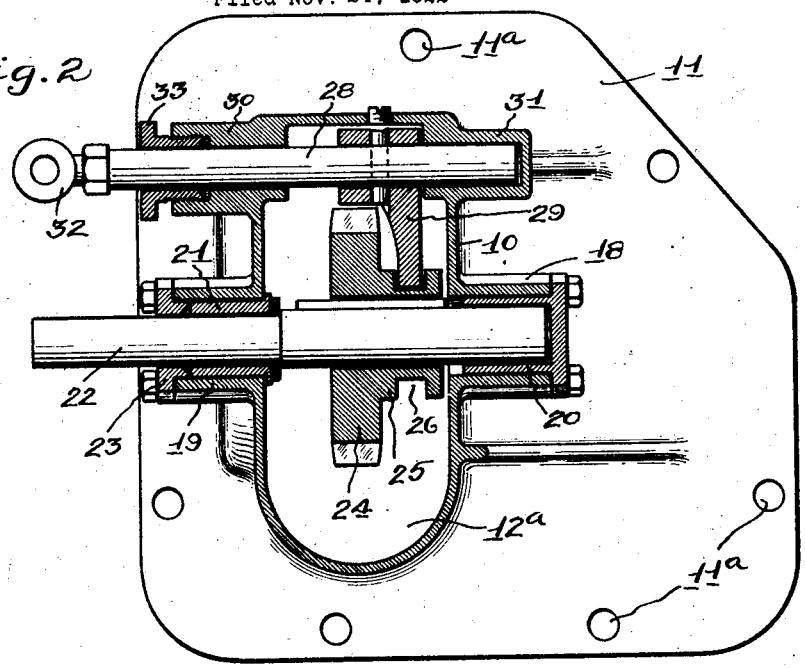
Figure 1:
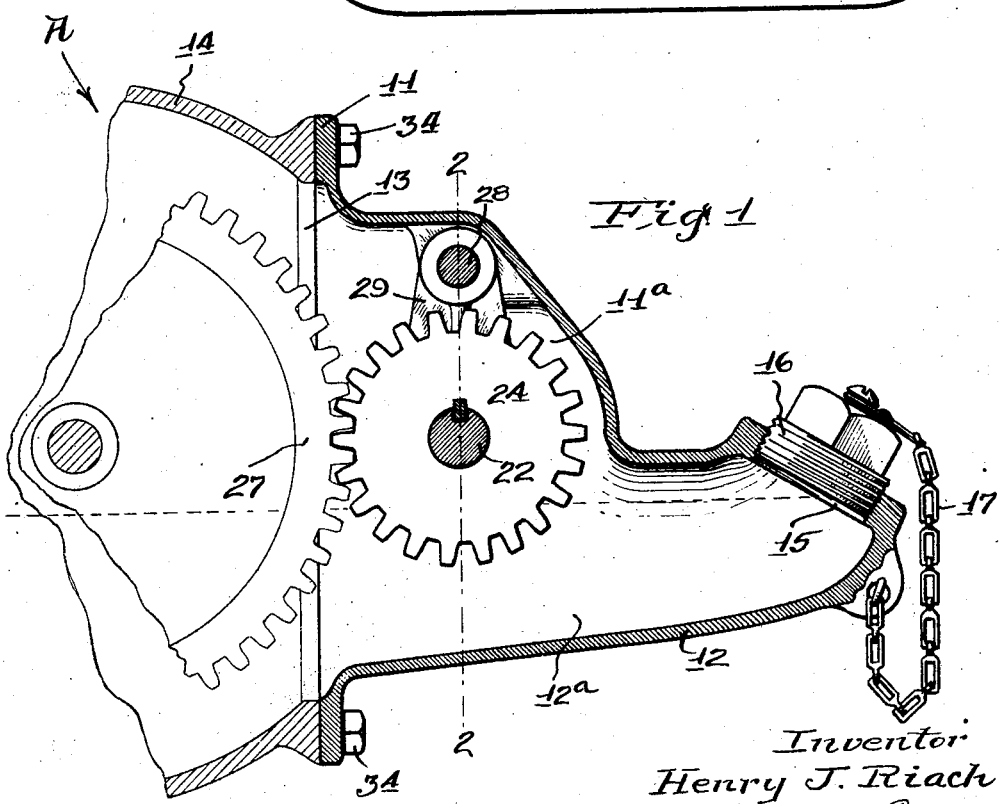

In the drawings, Fig. 1 is a longitudinal, central, sectional view of a device embodying my invention and Fig. 2 is a transverse sectional view thereof taken on the line 2—2 of Fig. 1.

Referring to the drawings, wherein similar reference characters have been used to indicate similar parts throughout the several views, it will be observed that my improvement includes a unitary structure comprising a shell-like body 10 merging into a plate 11 at the rear thereof and into a spout 12 at its forward side. The plate 11 is designed to cover a hand-hole, as at 13, in the casing 14 of a power transmitting mechanism indicated as at A in Fig. 1. The conduit 12ª in the spout 12 communicates with a gear receiving space 10ª in the body 10, the rearward portion of said conduit and the lower portion of said space being common one to the other. The body of the spout 12 is inclined slightly upward toward the front of the device, the forward extremity of said spout being sharply upwardly inclined, as shown, and formed with a threaded opening 15 in the end thereof. A threaded plug 16 for closing the opening 15 in said spout is guarded against misplacement by means of a chain 17, which has a swiveled attachment at one end with the plug 16 and is connected at its other end to the spout. Aligned bosses 18 and 19 are formed at the sides of the body 10. A cap-bushing 20 in the boss 18 and a bushing 21 in the boss 19 supply bearings for a power take-off shaft 22 journaled therein, one end of the shaft being extended beyond the boss 19 to provide stock for coupling said shaft with associated mechanism. A packing gland 23 fitted in the end of the boss and around the shaft 22 co-acts with the bushing 21 to prevent the leakage of oil about said shaft. A gear 24 feathered on the shaft 22 has an integral collar 25 formed with an annular groove 26 therein. This gear is shifted sidewise on the shaft 22 to throw the same into and out of mesh with a companion gear, as at 27, in the transmission with which the device is employed. The mechanism for shifting the gear 24 includes a reciprocable shaft 28 and a shifter-yoke 29 depending from said shaft, the branches of said shifter-yoke reaching into opposite sides of the groove 26 in the collar 25. Said shaft 28 slides in a bearing 30 on the body 10, the inner end of the shaft having a slidable support in a cap-like bearing 31 aligned with said bearing 30, while the outer end of said shaft 28 is equipped with a coupling eye 32 for attachment to a shifter rod or the like. A packing gland 33 fitted around the shaft 28 and in the end of the bearing 30 prevents the leakage of oil about said shaft 28.

The plate 11 is formed with screw receiving openings 11ª at its margins and is adapted to be fastened against the side of a transmission case by means of the screws 34 ordinarily employed in applying the usual hand-hole cover. The take-off gear 24 is proportioned and the shaft 22 located so that said gear 24 may be thrown into and out of mesh with the gear 27 of the companion power transmitter. The spout 12 is arranged so that the lowermost point in the mouth 15 thereof is located at the highest desired level of lubricant within the power transmitter. Being thus arranged, the spout 12 supplies a lubricant gauge and overflow, which assists in maintaining the proper quantity of grease in the power transmitter and, in addition, said spout serves as a container for lubricant into which the gear 24 dips.

Among the advantageous features resident in my improved device, it will be remembered that said device may be conveniently substituted for the ordinary hand-hole cover of a transmission casing; that is supplies a filler spout and gauge for the transmission casing with which it is employed and that the take-off gearing is lubricated from the supply of grease contained in said spout.

Changes in the specific form of my invention, as herein disclosed, may be made within the scope of what is claimed without departing from the spirit of my invention.

Having described my invention, what I claim as new and desire to protect by Letters Patent is:

In combination with a transmission gear and a gear casing therefore having a hand opening in one side near the bottom thereof, a closure for said opening forming a housing, a take-off shaft journaled in said housing, a driven gear mounted on said shaft adapted to mesh with said transmission gear, said driven gear being arranged to one side of said transmission gear with the lowermost portion thereof positioned above the lowermost portion of said transmission gear, and a spout formed on said closure communicating with said housing, a filler neck formed on said spout, the bottom of said spout extending below said driven gear and inclining towards said hand opening for successively conducting lubricant deposited therein from one gear to the other, said neck being positioned below said take-off shaft.

In testimony whereof, I have signed my name to this specification.

HENRY J. RIACH.